W. P. L. HERR.
Cutting Potato Seedings.
No. 47,106. Patented Apr. 4, 1865.
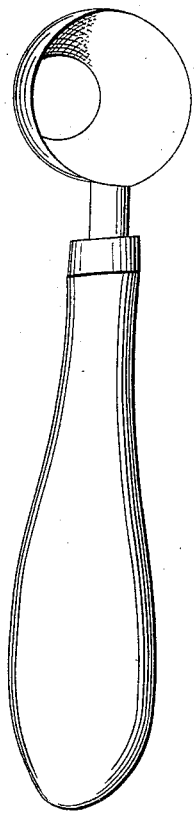
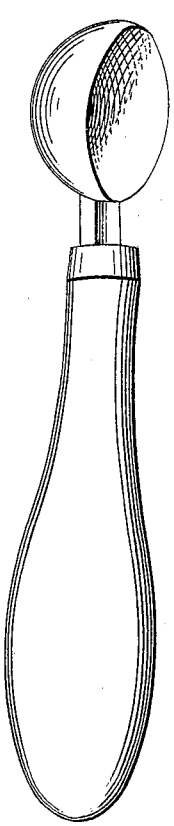

UNITED STATES PATENT OFFICE.

WILHELMINE PAULINE LEONTINE HERR, OF BROOKLYN, NEW YORK.

IMPROVEMENT IN INSTRUMENTS FOR CUTTING POTATO-SEEDLINGS.

Specification forming part of Letters Patent No. 47,106, dated April 4, 1865.

*To all whom it may concern:*

Be it known that I, WILHELMINE PAULINE LEONTINE HERR, of the city of Brooklyn, county of Kings, and State of New York, have invented a new and improved implement for the purpose of cutting potato-seedlings, paring and dressing potatoes, and o her vegetables, in a uniform size for cooking purposes and table use, as hereinafter stated.

I provide a hollow spoon, scoop, or cutter, of a semicircular, oval, or any other convenient form and outline, as shown in drawings, Figure 1, with a metallic or wooden handle, said spoon, scoop, or cutter to be made either solid with or separate from said handle. The body of said spoon, scoop, or cutter I cause to be made solid or with its bottom partly or totally removed, as shown in drawings, Fig. 2, the edge or rim of which said spoon, scoop, or cutter I make or cause to be made sufficiently sharp for cutting, and this said spoon, scoop, or cutter to be made of metal or any suitable substance or material.

In using said spoon, scoop, or cutter, I select an eye or germ of a potato, and place the said spoon, scoop, or cutter directly over and upon said eye or germ, so that this eye or germ forms the center of the cutting edge or rim of the said implement. I then force the cutting edge or rim a little way into the substance of the potato, and then by giving the said cutting edge or rim, or any part or portion thereof, by means of the handle, a semicircular motion, by which motion a piece of the potato will be cut out conformable to the inner shape of the said spoon, scoop, or cutter, and having the eye or germ for its base, and I repeat this operation on every eye or germ I desire to remove or extract from the substance of the potato.

This plan of cutting or scooping out the germ or eye by this method purports to remove only so much of the substance of the potato with the said germ or eye as is necessary to keep the seeding moist and allow it to germinate and fructify, saving thereby the larger portion of the potato for other purposes, and at the same time securing an earlier and safer germination, it being a well-established fact that the seedling cannot take root and thrive unless all foreign matter connected therewith has rotted away. I also use this spoon, scoop, or cutter for kitchen purposes, to wit: to cut and shape potatoes and other vegetables in half-balls or any other shape or form, (such as the spoon, &c., will produce,) in order to save paring and accelerating boiling and to secure uniformity of size, at the same time saving the residue, consisting of recesses, for other purposes.

What I claim as my invention, and desire to secure by Letters Patent, is—

A scoop or cutter, constructed substantially as shown in Fig. 2, for the purposes herein described.

WILHELMINE P. L. HERR.

Witnesses:
JAMES RODGERS,
JNO. I. BENSON.